United States Patent Office 2,801,475
Patented Aug. 6, 1957

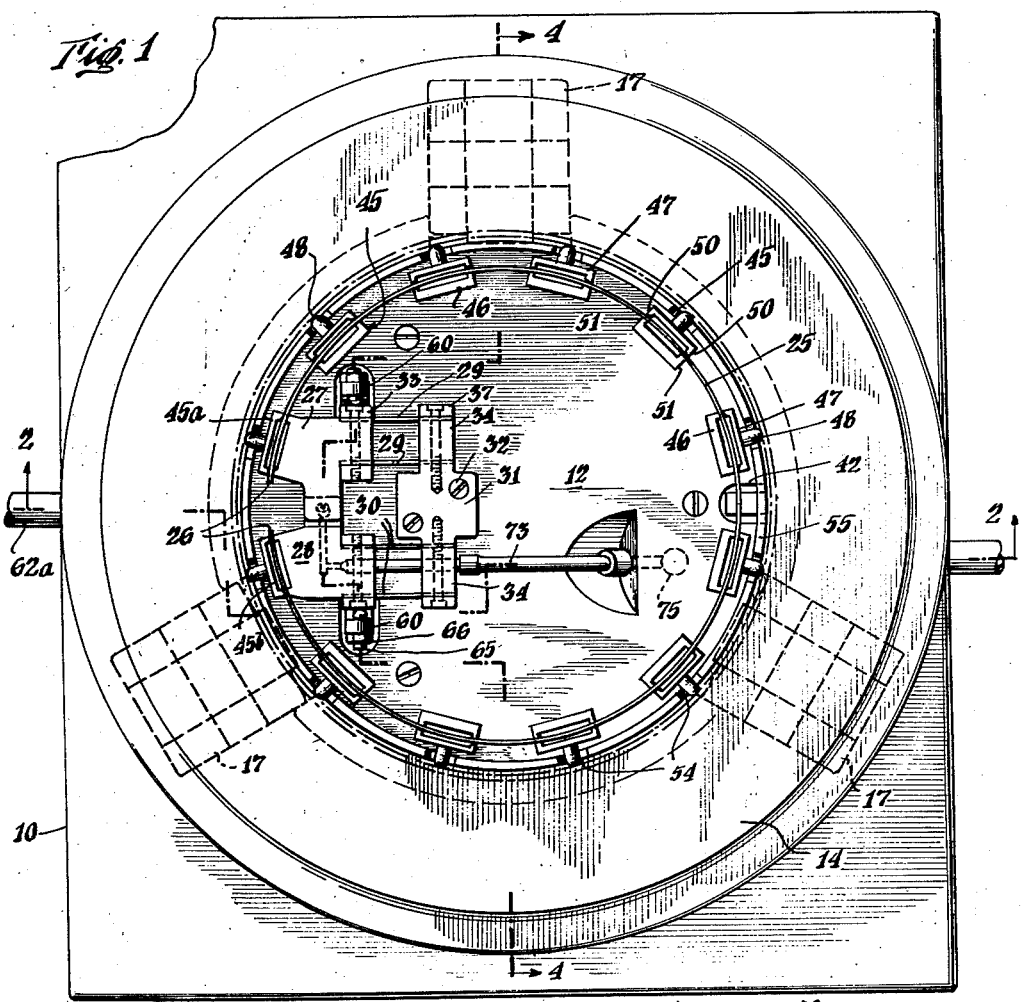

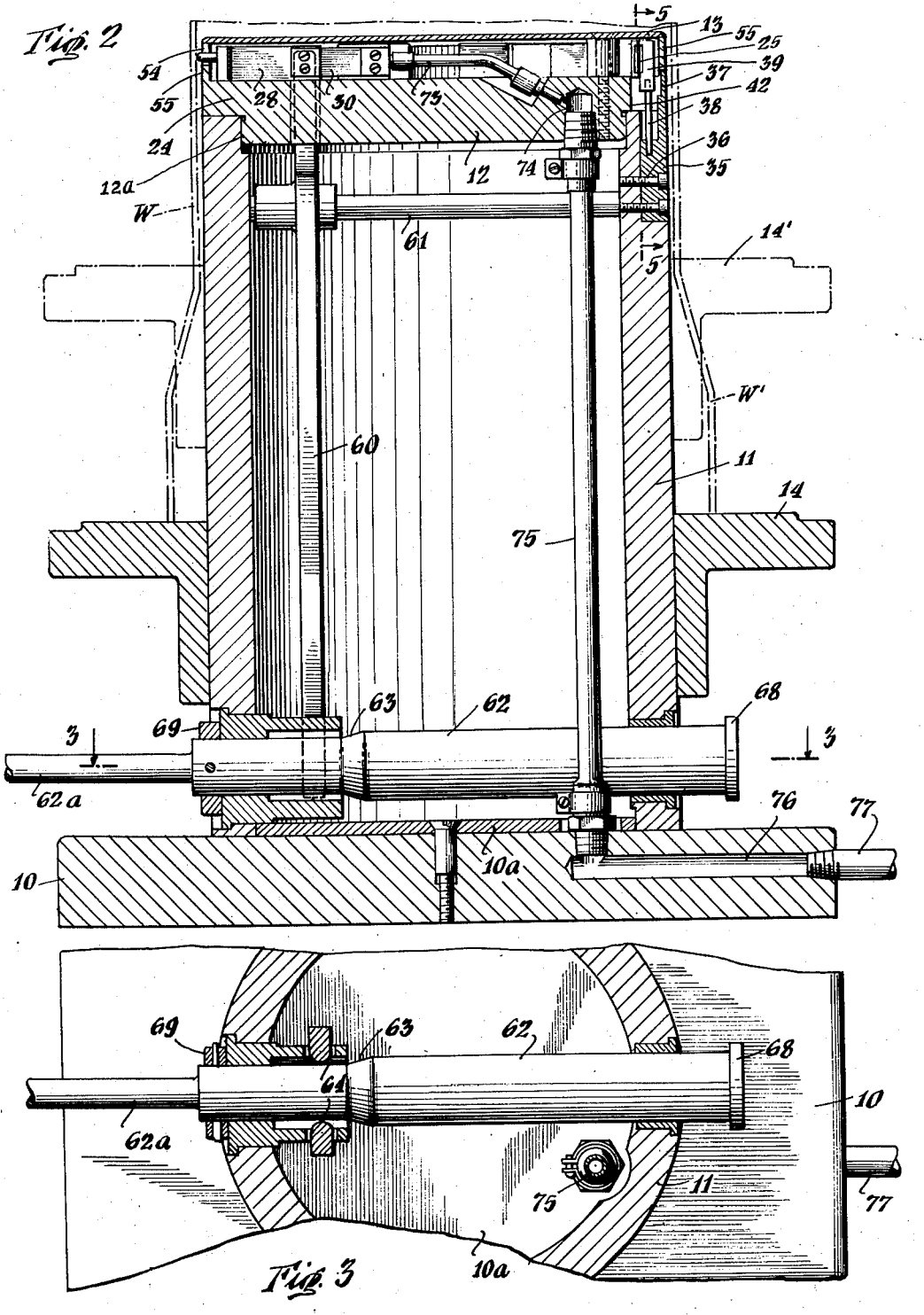

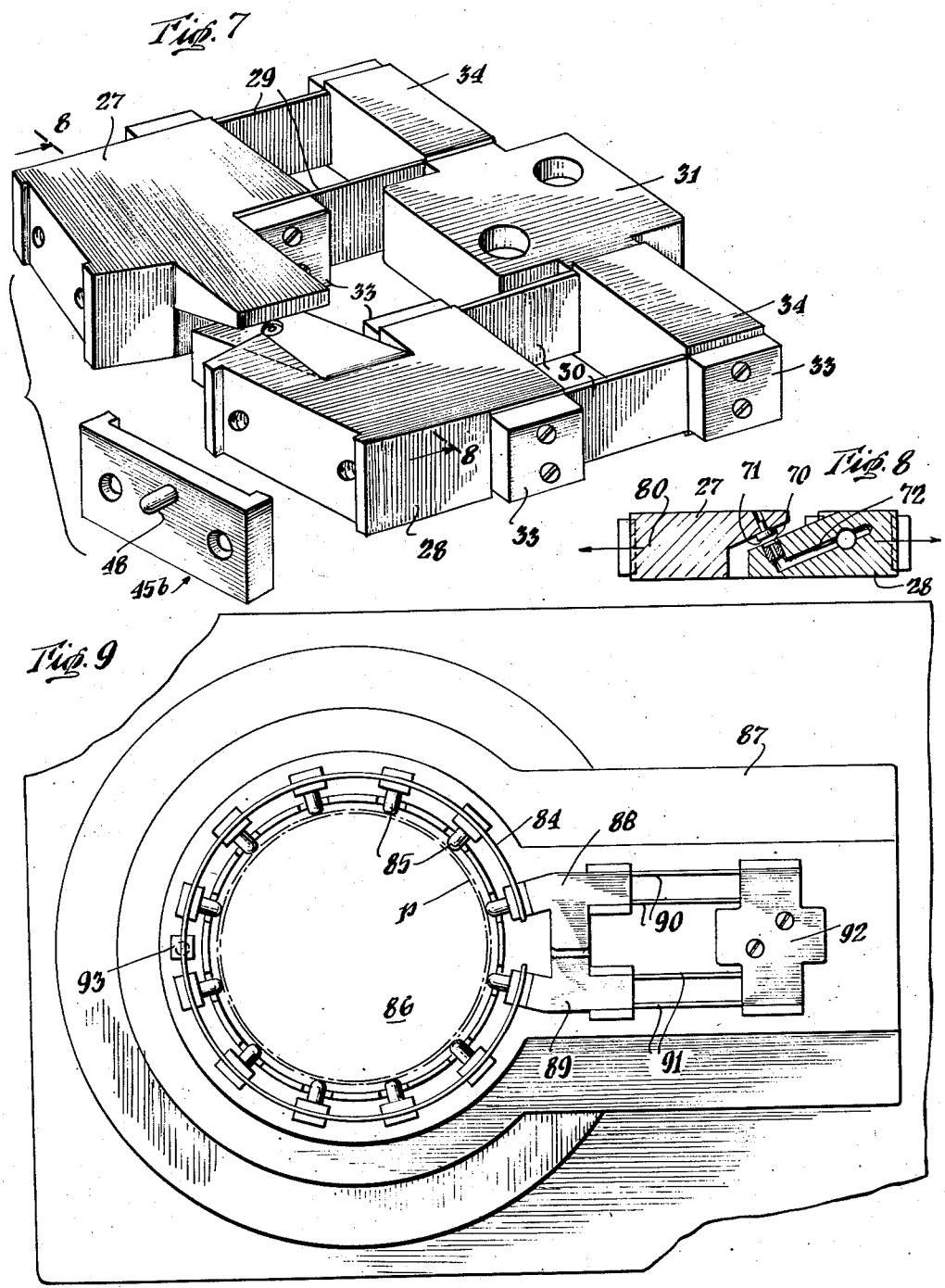

2,801,475

GAGE FOR MEASURING CIRCUMAMBIENT SURFACES

Franklin Meyer, Jr., Forestdale, R. I., assignor to The Taft-Peirce Manufacturing Company, Woonsocket, R. I., a corporation of Rhode Island Application September 15, 1955, Serial No. 534,465

18 Claims. (Cl. 33—179)

The present invention concerns a gage for measuring circumambient curved surfaces such as the external circumference of a cylinder or sleeve or the internal circumference of such a part, the measurement being translatable into terms of the diameter of a corresponding circular part. The gage is adapted particularly for the measurement of annular surfaces of thin walled cylindrical parts which have a tendency when unsupported to assume a shape which is out-of-round or non-circular. Examples of such parts are small electric motor casings, cylinder liners and the like. In many cases of that type the diameter must be machined to a rather close tolerance such as a few thousandths of an inch or even a narrower range, but when the part is removed from the holding fixture after the machining operation the periphery assumes a non-circular form making it difficult and unreliable to check by ordinary gaging means adapted to span the part diametrally.

The present device embodies as an essential element a flexible band of material such as spring steel which is arranged in a generally annular form but is interrupted at one point to provide two adjacent ends. In the embodiment as herein disclosed each of the ends is flexibly supported so as to have limited movement relative to each other, the supporting means comprising spring reeds connected to blocks or members secured to the ends of the flexible band. In general the band is permanently mounted but by means of flexible supports such as to permit a certain amount of float to enable the band to adjust itself to the annular surface to be measured. Mounted on the flexible band are a plurality of contact elements spaced successively along the band. The band is normally spring biased to cause the contact elements to engage against the surface. Manual means are provided to operate one or both of the blocks at the ends of the band to flex the band in the opposite direction to retract the contact elements when desired.

Associated with the ends of the band is an indicator means which is of a type to cooperate in enabling the contact elements each to engage freely the surface to be measured and permit movement of the ends of the band relative to each other. Such indicator means includes an air escape nozzle arranged in the block at one of the ends of the band and a complemental air escape reference surface formed on the block secured on the opposite end. The indicator means registers a reading which is in proportion to the speace at the orifice which is a direct measurement of the linear dimension around the cylinder which in turn is proportional to the diameter of the true circle having that circumference and the instrument may be graduated to read directly in terms of diameter.

The gaging device is of a character that lends itself to a convenient arrangement for measuring a cylinder at selected spaced points in the axial direction, and the device shown and described herein includes a combination of elements capable of effecting those objects and advantages.

Other objects and advantages will appear from a consideration of the embodiment of the invention herein after described.

The invention accordingly comprises the features of construction and the arrangement and relation of parts and manner of cooperation which will be exemplified in the structural embodiment shown in the drawings and hereinafter described.

Reference should be had in connection with the following detailed description to the various figures of the drawings, in which:

Fig. 1 is a top plan view of a complete gage apparatus embodying the principles of the invention, the top cover plate being removed to show better the contact elements;

Fig. 2 is a vertical sectional view taken on the line 2—2 of Fig. 1;

Fig. 3 is a horizontal sectional view taken on the line 3—3 of Fig. 2;

Fig. 5 is a fragmentary vertical sectional view taken on the line 5—5 of Fig. 2 showing details of a support for the elastic band;

Fig. 6 is a fragmentary horizontal view taken on the line 6—6 of Fig. 5;

Fig. 6a is a fragmentary enlarged detail of a portion of Fig. 6;

Fig. 7 is a view in perspective showing the spring reed mounting for the air nozzle blocks;

Fig. 8 is a vertical cross sectional view taken on the line 8—8 of Fig. 7 showing the nozzle arrangement; and Fig. 9 is a horizontal plan view of a modified form of gage device arranged for measuring the external annular surface of a cylinder.

Figure 4:
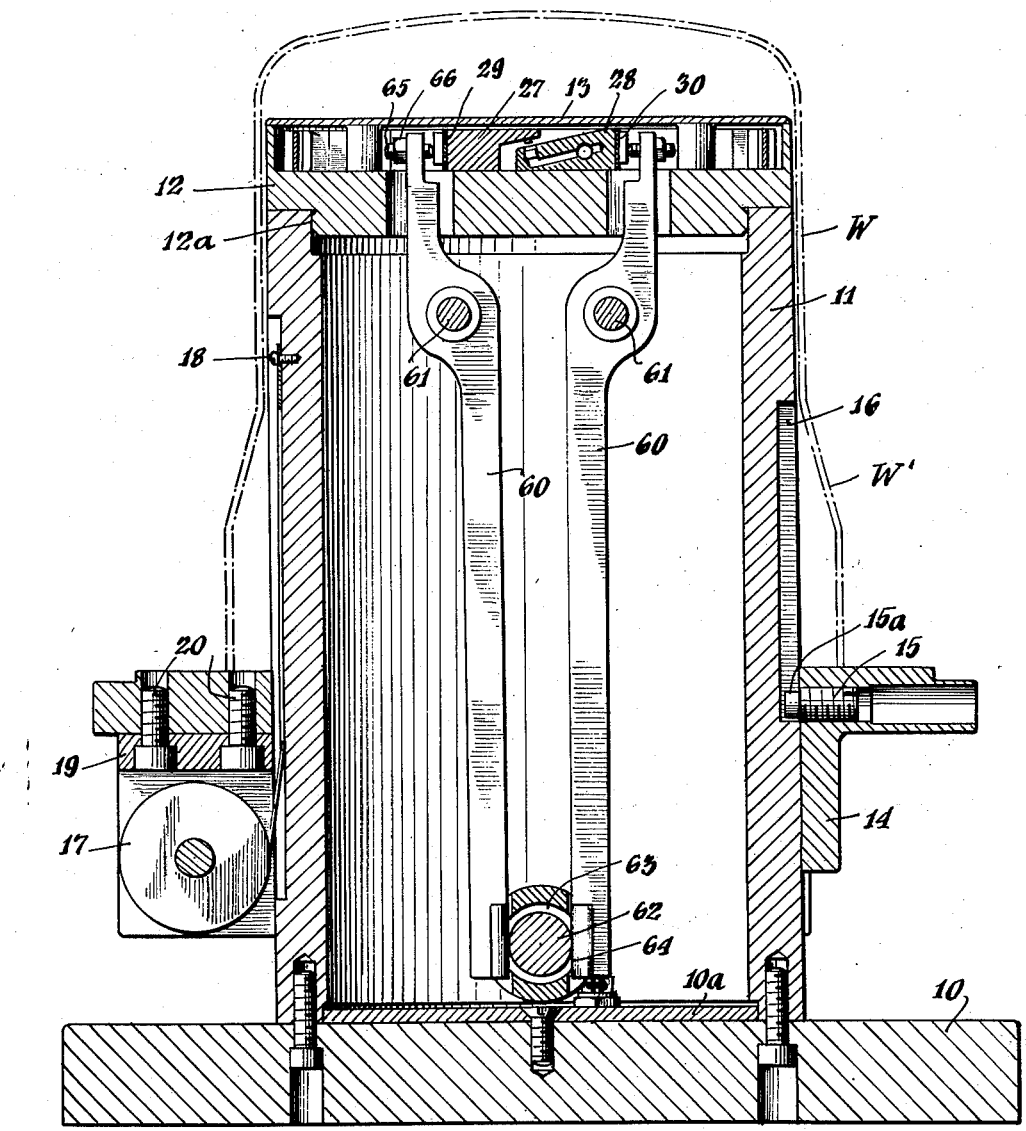
Fig. 4 is a vertical sectional view taken on the line 4—4 of Fig. 1 at right angles to the sectional view of Fig. 2.

The general features of the embodiment of the invention shown in the drawings, Figs. 1 to 8, include a suitable base such as that shown at 10 on which is mounted a vertical column 11 which may have at the base thereof a locating plate 10a. Mounted at the upper end of the column is a circular plate or cage 12 having a portion 12a of reduced diameter fitting within the upper end of column 11. A cover plate 13 extends over the top, it being omitted in Fig. 1. An annular worktable 14 is vertically slidable on the column 11, an upper position thereof being shown in broken lines at 14' in Fig. 2. The table may be held in non-rotary relation to the column 11 by means of a pin 15 threaded into a base of the table as shown in Fig. 4 and having a reduced forward stud portion 15a engaged in a slot 16 in the column. The ends of the slot 16 also serve to limit the upper and lower extreme positions of the worktable 14. Any suitable means may be provided for moving the worktable up and down on the column and securing it in adjusted position. Such means may comprise a counter balancing mechanism, which in the present device is in the form of a pre-stressed coiled helical flat spring of a type adapted to exert a constant force regardless of the extension thereof. Three such spring means 17 equally spaced around the column are employed. As shown in Fig. 4 one end of the spring in each case is secured at 18 to the column and the coil 17 is located in a small housing 19 secured by set screws 20 to the underside of the worktable 14. Further details of the spring means are unnecessary to an understanding of the present invention, such devices being well known in the art and a specific form thereof being shown in the patent to W. J. Cook No. 2,647,743. It is sufficient to note that the springs are of a character and adjusted such as to balance substantially the weight of the entire worktable 14 including the normal workpiece to be mounted thereon such that the table may be readily moved to a selected vertical position and will remain in the set position.

The present device is adapted for measuring the internal annular surface of a workpiece such as that indicated at W in Figs. 2 and 4. The particular workpiece shown is representative of a housing for electric motors which in a typical case has a portion W' of irregular shape as shown, but the upper portion is of cylindrical shape and is required to have an internal diameter machined to rather close limits such as a few thousandths of an inch at least. The measuring elements are located at the top of the column and may be utilized to measure the internal annular distance at various points along the axis of the workpiece W by moving the table and the workpiece vertically to the selected positions.

The gaging elements mounted at the top of the column include a flexible elastic band 25 of annular shape but interrupted at one point in its circumference and having therefore opposed ends 26 as shown particularly in Fig. 1. The opposed ends 26 are secured to and supported by a pair of blocks 27 and 28 each of which is suspended on a pair of flat spring reeds 29 and 30 respectively. The opposite ends of the reeds are secured to a block 31 which in turn is secured on the upper surface of the plate 12 by a pair of set screws 32. The details of the block members and reeds and supporting means are shown particularly in Fig. 7. Suitable caps may be employed to clamp the reeds on the members as indicated at 33 in Fig. 7. The means for clamping the reeds on the supporting block 31 include spacer blocks 34. Any suitable arrangement of clamping screws may be employed. If desired the reed ends may be set into slots in the respective members. The means for clamping the ends of the band 25 to the respective blocks 27 and 28 will be described shortly.

Diametrically opposite its ends 26 the elastic band 25 is supported on a flexible mount of which details are shown particularly in Figs. 2, 5 and 6. The mount includes a small block 35 secured in a slot in the column 11 by a pair of countersunk set screws 36, the block having an upper finger 37 adapted to fit into a slot in plate 12. Extending vertically from the block 35 as shown particularly in Figs. 2 and 5 is a flexible reed 38 which may be a round pin having a small diameter of about ⅛th inch or less. Secured to the upper end of the pin 38 is a small block 39 and clamped to the block 39 in opposed relation is a second block 40. The blocks are located on opposite sides of the flexible band 25 and have the band clamped between them by means of a pair of screws 41 extending through holes in the block 39 and the band 25 and threaded into the block 40. An opening 42 in the plate 12 (Fig. 6) permits free lateral movement of the blocks 39 and 40 on the stem 38. The contact between the supporting blocks and the band 25 is preferably limited as to area and comprises in the present case opposed ribs at the top and bottom, one such being indicated at 43 in Fig. 5, engaging against the surface of the band 25. It will be seen that the band 25 is supported entirely by flexible reed means and may float to a limited amount in the horizontal direction and adjust itself to the surface to be measured.

Mounted on the elastic band 25 are a plurality of equally spaced contact elements indicated generally at 45. The number of the contact elements may vary within limits dependent upon the circumstances, including the size of the workpiece, but in general they should be adequate in number to ensure that the flexible band 25 assumes a shape substantially corresponding to that of the cylinder being measured which commonly will be out-of-round. In normal circumstances there should be at least six in the complete circle but preferably a considerably larger number in the range of eight to fourteen. The gage shown herein which has been employed for measuring a cylinder about seven inches in diameter embodies twelve contact elements including the contacts 45a and 45b on the blocks 27 and 28 respectively. Each of the contact elements 45 includes a small inner block or plate 46 and an opposed outer plate 47, the plate 47 having thereon a radially projecting pin or button 48 with a rounded end adapted to engage against the inner surface of the workpiece W to be measured. As shown particularly in Figs. 6 and 6a the plates or blocks 46 and 47 have opposed end ribs 50 and 51 respectively between which is clamped the band 25. Also the ribs 50 and 51 preferably are curved or beveled in the horizontal direction so as to conform substantially with the shape of the band 25 and the bevel on one or both of the ribs may be increased so as to grip the band only at the outside edges of the ribs as indicated at 50a in Fig. 6a. The band therefore is free to flex, including the area 52 (Fig. 6) between the ribs, without stress or distortion from the means for clamping the blocks on the band. The clamping means comprises a pair of horizontally spaced set screws 53 projecting through holes in the plate 47 and in the band 25 and threaded into holes in the plate 46. The contact elements 45a and 45b at the ends of the band each include plates similar to the plates 47 previously described but arranged to clamp the band 25 directly to the corresponding block 27 or 28. The band 25 and the contact elements 45 are mounted within the protective plate 12 but the contact elements are free of any restrictive rubbing contact therewith, the contact pins 48 extending through notches 54 in the upper flange part 55 of the plate 12. The band 25 is normally biased in the direction to cause the contact elements 48 to project outwardly into engagement with the wall of the workpiece W. This effect may be accomplished in various ways. Normally it is preferred to employ a band which is inherently self-biased in that direction. A suitable band material may comprise flat spring steel of a width of about ½ inch and may possess considerable strength. In addition the flat spring reeds 29 and 30 supporting the ends of the flat band 25 may be arranged to exert some force in the band expansion direction.

It is necessary to provide means for contracting the band and thereby retracting the pins 48 particularly for the purpose of initially applying the workpiece W and also when the worktable 14 is being shifted to move the workpiece to another test position. A particularly convenient and efficient means for contracting the band is shown in Figs. 2, 3 and 4 which includes a pair of opposed levers 60 pivoted within the column at 61. The lower ends of the levers 60 straddle a cam pin 62 mounted for axially slidable movement in a horizontal direction in the base of the column as shown particularly in Fig. 3, the outer end 62a being provided with a knob (not shown) adapted to be manually grasped. The pin 62 has a cam surface 63 adapted to engage against the rounded surfaces 64 of the lower ends of the levers 60 and to spread apart the levers at the bottom. The upper ends of the levers 60 are each provided with adjustable contact pins 65 screw threaded through the levers and adapted to be secured in position by a lock-nut 66. The inner ends of the pins 65 are adapted to engage against the corresponding caps 33 secured to the respective blocks 27 and 28. Outward movement of the pin 62 and the cam part 63 forces together the blocks 27 and 28 and contracts the band 25. The limits of movement of the pin 62 may be determined by means of a plate 68 attached to the inner end and a washer 69 pinned to the outer end.

In the expansion and contraction of the band 25 the blocks 27 and 28 move relative to each other to provide a corresponding variation in the space between the ends of the band 25 and in effect between the blocks 27 and 28. Such relative spacing will be a measure of the annular surface and a particularly effective and practical form of means for indicating such relative spacing is provided in the present device. In general it is based on the principle of a fluid orifice arranged to discharge against a reference surface such as shown particularly in Fig. 8, the orifice being indicated at 70 and the reference surface at 71. The orifice 70 is connected to a passage 72 in the block 28 and the passage 72 has connected thereto a flexible duct 73 the opposite end of which is secured in the plate 12 and communicates with a passage 74 therein which in turn is connected to a vertical pipe 75 within the column 11, which in turn communicates with a passage 76 in the base and with a supply pipe 77.

It will be understood that line 77 is connected to a source of elastic fluid which embodies therein an indicator means responsive to variations in the flow or pressure in the line extending from the pipe 77 through passage 72 in accordance with the discharge gap at the orifice 70. Any suitable means may be employed, but a particularly practical form of indicator means for the purpose is disclosed in the prior Patent 2,513,374 of which I am the patentee jointly with Clifford Stead.

Variations in the diameter will result in variations at the ends of the flexible band increased by a factor of 3.1416. However, there are limits to the range of the gap at the nozzle within which given variations will produce uniform variations at the indicator. Accordingly in many cases it is desirable to provide a wider tolerance range for the gage device by a nozzle and reference surface arrangement such as that illustrated in which the reference surface is positioned at an acute angle to the line of relative movement 80 (Fig. 8). With such a relation the space between the nozzle 70 and the reference surface 71 will vary as the sine function of the angle of the reference surface 71 with respect to line 80 rather than directly as the relative movement between the blocks 27 and 28. The variation in the amount of the discharge gap will always be in proportion to, but less than, the absolute relative movement of the blocks in the direction of line 80.

It should be noted that the arrangement of the reeds 29 and 30 and the mounting therefor is of a character such that any component of the bodily movement of the blocks 27 and 28 toward or away from the fixed support 31 due to swinging in an arc on the reeds is in a direction parallel to the reference surface 71 and the nozzle escape gap is determined solely by the amount of relative movement in the direction 80.

The invention has been described and illustrated in connection with a device adapted to measure the annular internal surface of a hollow cylindrical part but the principles thereof are adapted to the measurement of external surfaces and the term circumambient as used herein is intended to cover both such types of surfaces and measurements. In furtherance of the above, attention is now directed to Fig. 9 showing the general arrangement in the application of the invention to the measurement of the external surface of a cylindrical part P. In this case the flexible spring band 84 is arranged externally of the workpiece and has contact pins or buttons 85 mounted on the band extending radially inwardly from the band. The workpiece P is supported on a central member 86, and the band 84 is mounted on a support 87 by flexible means similarly to the arrangement of Figs. 1 to 8 and includes a pair of blocks 88 and 89 each mounted at the ends of a pair of flat spring reeds 90 and 91 respectively, the opposite ends of which are clamped to the block 92 which is secured to the support 87. An intermediate support is also provided at 93 which may be similar to the one shown in Fig. 5. The band 84 is normally biased in a closing direction to engage the contact pins 85 against the cylinder P. Expansion of the band may be effected by any suitable means such as levers arranged to press apart the blocks 88 and 89. For general use in measuring the circumference of the cylinder P at various points axially thereof the supports 86 and 87 are made relatively movable in the axial direction that is perpendicular to the plane of the paper.

Since certain changes may be made in the above constructions and different embodiments of the invention could be made without departing from the scope thereof, it is intended that all matter contained in the above description or shown in the accompanying drawings shall be interpreted as illustrative and not in a limiting sense.

I claim:

1. In a gage for measuring circumabient surfaces, a band of flexible spring material and of annular shape interrupted to provide two adjacent ends, flexible supporting elements connected to said band, a plurality of contact elements mounted in spaced relation along said band and projecting radially from said band in a direction adapted to engage against the surface to be measured, and indicator means connected to the said adjacent ends.

2. In a gage for measuring circumambient surfaces, a flat elastic band of annular shape interrupted to provide two adjacent ends, flexible supporting elements connected to said band, a plurality of contact elements mounted in spaced relation along said band and projecting radially from said band in a direction adapted to engage against the surface to be measured, and indicator means associated with said adjacent ends embodying a fluid orifice in a member mounted on one end and a complemental reference surface mounted on the other end.

3. In a gage for measuring circumambient surfaces, a flat elastic band of annular shape interrupted to provide two adjacent ends, flexible supporting elements connected to said band, a plurality of contact elements mounted on said band and projecting radially from said band in a direction adapted to engage against the surface to be measured there being not less than six of said elements spaced substantially uniformly around said band, and indicator means connected to the said adjacent ends.

4. In a gage for measuring circumambient surfaces, a flexible band of annular shape interrupted to provide two adjacent ends, a mounting fixture, said band being supported thereon solely by elongated flexible elements connected respectively to said band and said fixture, a plurality of surface contact elements mounted in successively spaced relation along said band, and indicator means connected to register the opening at said adjacent ends.

5. In a gage for measuring circumambient surfaces, a flexible band of annular shape interrupted to provide two adjacent ends, a support, said band being mounted and supported thereon by means comprised solely of elongated flexible reeds one end of which is secured to said support and the other end connected to said band in each case, a plurality of surface contact elements mounted in successively spaced relation along said band, and indicator means connected to said adjacent ends.

6. In a gage for measuring circumambient surfaces, a flexible band of annular shape interrupted to provide two adjacent ends, indicator means connected to said ends to indicate the measurement around said surface, and a plurality of contact elements mounted on said band, each of said elements embodying a mounting bracket clamped to said band, the band engaging surfaces being shaped substantially in conformance with the general arc-shape of the band, and a contact button projecting radially from the bracket adapted to engage the surface to be measured.

7. In a gage for measuring circumambient surfaces, a band of flexible spring material and of annular shape interrupted to provide two adjacent ends, indicator means connected to said ends to indicate the measurement around said surface, and a plurality of contact elements mounted on said band, each of said elements embodying a pair of complemental bracket members each having lugs spaced circumferentially of said band and arranged in opposed pairs with the band between, means for clamping said members together on the band, one of said members having a contact button projecting radially therefrom adapted to engage the surface to be measured.

8. In a gage for measuring circumambient surfaces, a flexible band of annular shape interrupted to provide two adjacent ends, a support for said band, indicator means of the orifice discharge type connected to said ends comprising a member mounted on one band end having a discharge orifice and a flexible conduit for fluid connected to said orifice, and a fluid discharge reference surface provided on a member mounted on the other band end, a pair of elongated flexible supporting reeds for each of said members each reed having one end connected to the respective member and the opposite end secured to said support, and a flexible support for said band spaced from and intermediate of said ends comprising an elongated flexible reed having one end secured to the band and the other end secured to said support.

9. In a gage for measuring circumambient surfaces, a flexible band of annular shape interrupted to provide two adjacent ends, a support for said band, indicator means of the orifice discharge type connected to said ends comprising a member mounted on one band end having a discharge orifice and a flexible conduit for fluid connected to said orifice, and a fluid discharge reference surface provided on a member mounted on the other band end, a pair of elongated flexible supporting reeds for each of said members each reed having one end connected to the respective member and the opposite end secured to said support, a flexible support for said band spaced from and intermediate of said ends comprising an elongated flexible reed having one end secured to the band and the other end secured to said support, said reeds comprising the sole support for said band, and a plurality of contact elements mounted in spaced relation along said band adapted to engage against the surface to be gaged.

10. In a gage for measuring circumambient surfaces, a flexible band of annular shape interrupted to provide two adjacent ends, a support for said band, indicator means of the orifice discharge type connected to said ends comprising a member mounted on one band end having a discharge orifice and a flexible conduit for fluid connected to said orifice, and a fluid discharge reference surface provided on a member mounted on the other band end, a pair of elongated flexible supporting reeds for each of said members each reed having one end connected to the respective member and the opposite end secured to said support and said reeds extending in a direction substantially parallel to the general plane of the band, and a flexible support for said band spaced from and intermediate of said ends comprising an elongated flexible reed having one end secured to the band and the other end secured to said support, said last named reed extending in a direction substantially perpendicular to the general plane of the band.

11. In a gage for measuring circumambient surfaces, a flexible band of annular shape interrupted to provide two adjacent ends, a support for said band, indicator means of the orifice discharge type connected to said ends comprising a member mounted on one band end having a discharge orifice and a flexible conduit for fluid connected to said orifice, and a fluid discharge reference surface provided on a member mounted on the other band end, a pair of elongated flexible supporting reeds for each of said members each reed having one end connected to the respective member and the opposite end secured to said support, a plurality of contact elements mounted in successively spaced relation along said band, said band being normally biased in the direction of engaging said elements against the surface to be measured, and manually operable means connected to at least one of said members to effect movement thereof to flex said band in the element retracting direction.

12. In a gage for measuring circumambient surfaces, a band of flexible spring material and of annular shape interrupted to provide two adjacent ends, a main support, elements connecting said band and main support for supporting the band thereon, a plurality of contact elements mounted in spaced relation along said band including pins radially extending from the band and adapted to contact the surface being measured, a ring mounted on said support and having openings through which said pins extend, and indicator means connected to register the relative positions of said ends.

13. In a gage for measuring circumambient surfaces, a flexible band of annular shape interrupted to provide two adjacent ends, a main support, flexible elements connecting said band and main support for supporting the band thereon, a plurality of contact elements mounted in spaced relation along said band including pins radially extending from the band and adapted to contact the surface being measured, a ring mounted on said support and having openings through which said pins extend, said band being normally biased in the direction to project said elements through said ring into engagement with the surface to be measured, and means for positively flexing said band in opposition to said biasing to retract said pins from projecting beyond the opposite surface of the band, and indicator means connected to said adjacent ends.

14. In a gage for measuring circumambient surfaces, a flexible flat band of annular shape interrupted to provide two adjacent ends, a plurality of surface contact elements mounted in successively spaced relation along said band, said band being inherently self-biasing in the direction to engage said contact elements against the surface to be measured, means to spring said band in the opposite direction to retract said elements, and indicator means connected to register the opening at said ends and thereby the measurement of said surface.

15. In a gage for measuring circumambient surfaces, a flexible flat band of annular shape interrupted to provide two adjacent ends, a main support, means for flexibly supporting said band thereon comprising a plurality of flexible reeds each having one end connected said band and the opposite end secured on said support, a plurality of surface contact elements mounted in successively spaced relation along said band, said band being inherently self-biasing in the direction to engage said contact elements against the surface to be measured, manually operable means to flex said band in the opposite direction to retract said elements, and indicator means connected to register the opening at said ends and thereby the measurement of said surface.

16. In a gage for measuring an annular surface of a cylinder, a base including a column thereon, a work supporting table mounted adjacent thereto, said table and column being relatively movable in the direction of the axis of said column, and means for measuring the annular distance around said cylinder at selected axial points in accordance with the selected relative axial positions of the table and column comprising a flexible band of annular shape mounted on said column said band being interrupted to provide two adjacent ends, a plurality of surface contact elements mounted in successively spaced relation along said band arranged to contact the surface to be measured upon flexing of said band, and indicator means connected to register the variation in opening at said adjacent ends.

17. In a gage for measuring an annular surface of a cylinder, a base including a column thereon, a work supporting table mounted concentrically with said column, said table and column being relatively movable in the direction of the axis of said column, and means for measuring the annular distance around said cylinder at selected axial points in accordance with the selected relative axial positions of the table and column comprising a flexible band of annular shape mounted on said column said band being interrupted to provide two adjacent ends, a plurality of surface contact elements mounted in successively spaced relation along said band arranged to contact the surface, said band being normally biased in the direction to engage said elements against the surface, manually operable means with connections to said ends for flexing said band in the opposite direction to retract said elements, and indicator means connected to register the relative position of said ends.

18. A gage for measuring an annular surface of a cylinder having in combination, a base including a vertical column, an annular work supporting table extending around said column and movable relative to the axis of said column, a flexible band of annular shape flexibly mounted horizontally on said column adjacent the upper end, said band being interrupted to provide two adjacent relatively movable ends, means for flexibly supporting said band on said column including flexible reeds each having one end connected to one of the adjacent ends of said band and the other end secured to said column, a plurality of contact elements located in successively spaced relation along said band, said band being normally biased in the direction to engage said elements against the surface to be measured, means for manually flexing said band to retract said elements comprising a pair of levers pivoted in said column each having an upper end connected to one of said band ends, and means located at the lower ends of said levers for manually operating them to move the said ends of the band in the element retracting position, and indicator means connected to register the variation in relative spacing of said band ends.

References Cited in the file of this patent
UNITED STATES PATENTS

| | | |
|---|---|---|
| 1,385,139 | MacDougal | July 19, 1921 |
| 2,566,970 | Swensson | Sept. 4, 1951 |
| 2,623,294 | Fox | Dec. 30, 1952 |
| 2,672,695 | Williams | Mar. 23, 1954 |